United States Patent [19]

Yasue et al.

[11] Patent Number: 4,495,830
[45] Date of Patent: Jan. 29, 1985

[54] AUTOMATIC TRANSMISSION FOR A VEHICLE

[75] Inventors: Hideki Yasue; Kagenori Fukumura, both of Toyota, Japan

[73] Assignee: Toyota Jidosha Kogyo Kabushiki Kaisha, Toyota, Japan

[21] Appl. No.: 394,307

[22] Filed: Jul. 1, 1982

[30] Foreign Application Priority Data

Sep. 11, 1981 [JP] Japan ................................. 56-144335

[51] Int. Cl.³ ............................................. F16H 57/04
[52] U.S. Cl. ...................................................... 74/467
[58] Field of Search ........................... 74/467; 184/6.12

[56] References Cited

U.S. PATENT DOCUMENTS

| | | | |
|---|---|---|---|
| 1,429,942 | 9/1922 | Francis | 74/467 |
| 4,157,045 | 6/1979 | Suzuki | 74/467 X |
| 4,222,283 | 9/1980 | Nagy | 74/467 |
| 4,227,427 | 10/1980 | Dick | 74/467 |
| 4,231,266 | 11/1980 | Nishikawa et al. | 74/467 |
| 4,261,219 | 4/1981 | Suzuki et al. | 74/467 |
| 4,347,759 | 9/1982 | Renk et al. | 74/467 |
| 4,366,724 | 1/1983 | Yamamori et al. | 74/467 |

FOREIGN PATENT DOCUMENTS

| | | | |
|---|---|---|---|
| 52265 | 4/1979 | Japan | 74/467 |
| 103151 | 8/1980 | Japan | 74/467 |
| 2041117 | 9/1980 | United Kingdom | 74/467 |

*Primary Examiner*—George H. Krizmanich
*Assistant Examiner*—Dirk Wright
*Attorney, Agent, or Firm*—Parkhurst & Oliff

[57] ABSTRACT

An automatic transmission for a vehicle having a torque converter driven by an engine, an input shaft driven by the torque converter, a gear train driven by the input shaft, an output shaft driven by the gear train, a counter drive gear fixed to the output shaft at one end thereof opposite the input shaft, a counter shaft substantially parallel to the output shaft, a counter driven gear fixed to the counter shaft at one end thereof and meshed with the counter drive gear, a differential drive pinion gear fixed to the counter shaft at the other end thereof and meshed with a drive gear for a differential gear, first and second tapered roller bearings near the counter driven gear and the differential drive pinion gear, respectively, for supporting the counter shaft, said counter shaft being accommodated in a counter shaft chamber of a transmission casing, said counter driven gear being accommodated in a transfer chamber adjacent to the counter shaft chamber and separated therefrom by the first tapered roller bearing, transmission oil stored in the lower spaces of the counter shaft and transfer chambers, the lower portions of the counter driven gear and the first tapered roller bearing being immersed in the oil. A disc-like oil deflector having a central aperture is fixed to the inner wall of the counter shaft chamber adjacent to the first tapered roller bearing. The counter shaft is inserted loosely into the central aperture of the oil deflector.

5 Claims, 6 Drawing Figures

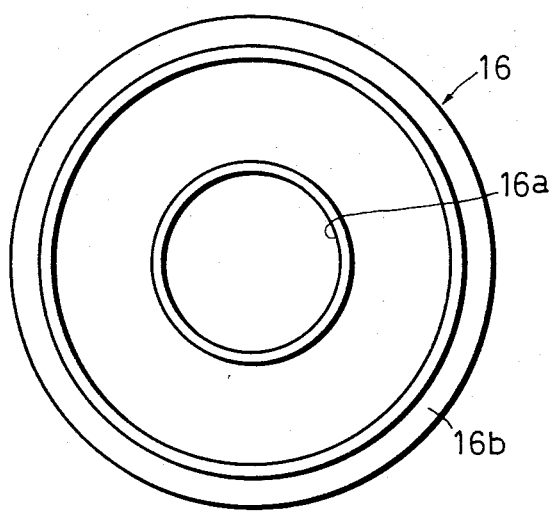
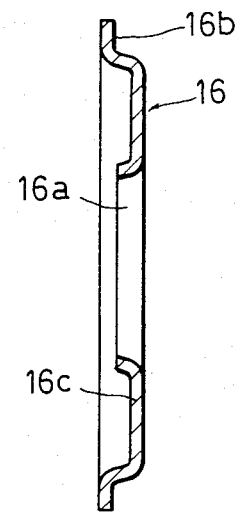
FIG. 3A  FIG. 3B
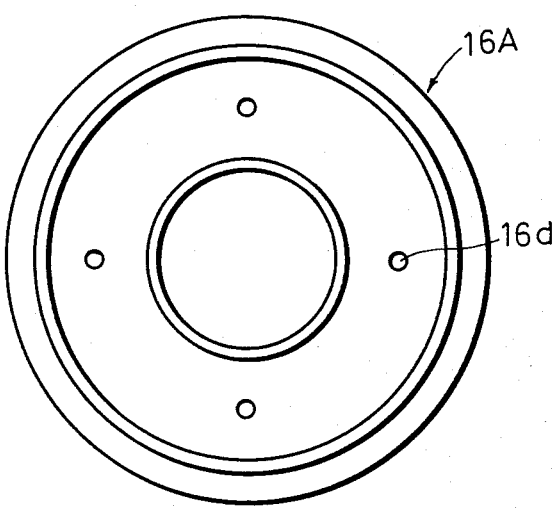
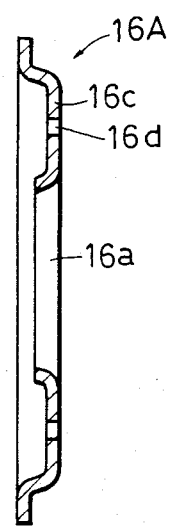
FIG. 4A  FIG. 4B

AUTOMATIC TRANSMISSION FOR A VEHICLE

BACKGROUND OF THE INVENTION

This invention relates to an automatic transmission for a vehicle having a counter shaft for transmitting the output from an engine-driven torque convertor to a differential gear.

A vehicle of a front drive type having an automatic transmission is generally provided with a counter shaft between the transmission and the differential gear. The counter shaft is provided with a counter driven gear at one end for receiving an output from the transmission and with a pinion gear at the other end for driving the differential gear. Both of the gears are normally helical gears and as the result, a thrust acts in the axial direction of the counter shaft during the rotation of the counter shaft. For receiving the thrust, the counter shaft is supported by a tapered roller bearing. When the tapered roller bearing is rotated in transmission oil, a pumping action occurs due to a centrifugal force generated by the rotation of the roller of the bearing and thus the transmission oil is pumped from the smaller diameter portion of the roller to the larger diameter portion thereof, and is further supplied from the roller bearing to the counter driven gear. Accordingly, the amount of the transmission oil stirred by the counter driven gear is increased, thereby increasing the amount of air bubbles mixed into the oil and excessively raising the level of the oil surface. When a large number of air bubbles are mixed into the oil, the efficiency of the torque convertor is deteriorated and therefore the efficiency of the automatic transmission is also deteriorated. If such aerated oil is sucked into an oil pump, the pumping efficiency is decreased and the air is likely to dwell in a hydraulic circuit of the automatic transmission, thereby resulting in failure of the hydraulic control.

SUMMARY OF THE INVENTION

Accordingly, a primary object of the present invention is to provide an automatic transmission which prevents transmission oil in a counter shaft chamber from flowing into a transfer chamber when a pumping action occurs due to the rotation of the counter shaft in the tapered roller bearing provided between the counter shaft chamber and the transfer chamber.

Another object of the present invention is to provide an automatic transmission which reduces the amount of transmission oil in a transfer chamber as well as the amount of air bubbles mixed into the transmission oil, thereby minimizing the rise in level of the oil surface.

A further object of the present invention is to provide an automatic transmission which improves the efficiency of itself and of the oil pump and prevents air bubbles from dwelling in the hydraulic circuit of the automatic transmission, eliminating thereby preventing failure of the hydraulic control system due to the existence of air therein.

According to the present invention, an automatic transmission for a vehicle has a torque convertor adapted to be driven by an engine, an input shaft into which an output from the torque convertor is transmitted, a gear train into which an output from the input shaft is transmitted, an output shaft into which an output changed by the gear train is transmitted, a counter drive gear fixed to the output shaft at one end thereof opposite the input shaft. A counter shaft is arranged in substantially parallel relation with the output shaft and a counter driven gear is fixed to the counter shaft at one end thereof and meshed with the counter drive gear. A differential drive pinion gear is fixed to the counter shaft at the other end thereof and meshed with a drive gear for a differential gear. First and second tapered roller bearings are provided in the vicinity of the counter driven gear and the differential drive pinion gear, respectively, for supporting the counter shaft. The counter shaft is accommodated in a counter shaft chamber of a transmission casing, and the counter driven gear being is accommodated in a transfer chamber adjacent to the counter shaft chamber, the counter shaft chamber and the transfer chamber being separated by the first tapered roller bearing. Transmission oil is stored in the lower spaces of the counter shaft chamber and the transfer chamber, the lower portions of the counter driven gear and the first tapered roller bearing being immersed in the transmission oil. A disc-like oil deflector having a central aperture is fixed to the inner wall of the counter shaft chamber adjacent to the first tapered roller bearing and the counter shaft is loosely inserted into the central aperture of the oil deflector.

Various general and specific objects, advantages and aspects of the invention will become apparent when reference is made to the following detailed description of the invention considered in conjunction with the related accompanying drawings.

BRIEF DESCRIPTION OF THE DRAWINGS

FIG. 3A is an elevational view of the oil deflector according to a first preferred embodiment;

FIG. 3B is a vertical sectional view of FIG. 3A;

FIG. 4A is an elevational view of the oil deflector according to a second preferred embodiment; and FIG. 4B is a vertical sectional view of FIG. 4A.

DETAILED DESCRIPTION OF THE PREFERRED EMBODIMENTS

Figure 1:
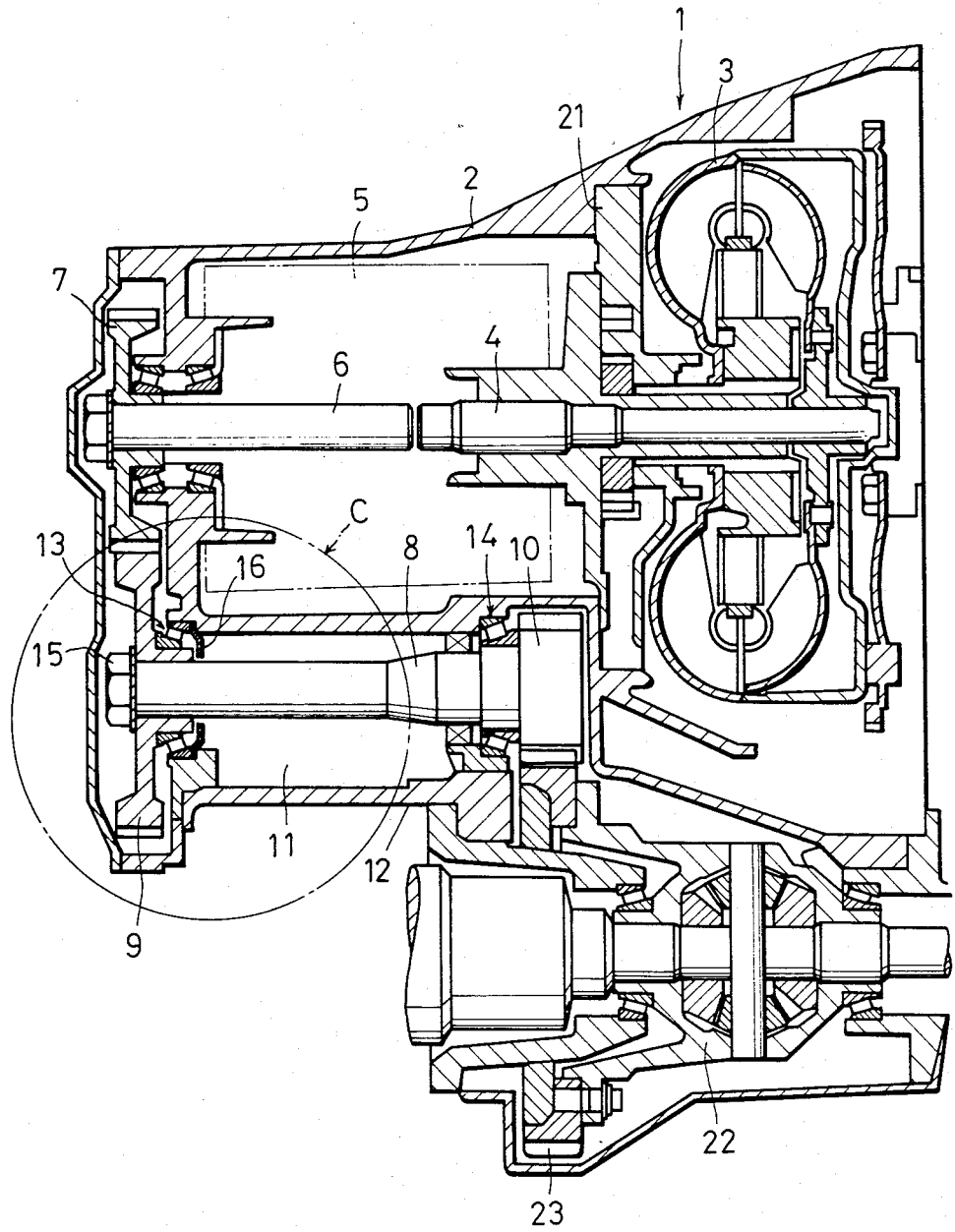
FIG. 1 is a vertical sectional view of the automatic transmission according to the present invention.

Referring now to FIG. 1, reference numeral 1 designates an automatic transmission of an automobile of a front drive type. A torque converter 3 is accommodated in a transmission casing 2 of the automatic transmission 1. The torque convertor 3 is driven by an engine (not shown) and the output from the torque convertor 3 is transmitted to an input shaft 4 and in turn to a gear train 5 (shown in block diagrammatic form only). The output is changed by the gear train 5 and is in turn transmitted to an output shaft 6 arranged coaxially with the input shaft 4. A counter drive gear 7 is fixed to the output shaft 6 at one end thereof on the opposite side of the input shaft 4 and is meshed with a counter driven gear 9 fixed to a counter shaft 8 at one end thereof arranged in parallel relation with the output shaft 6. Accordingly, when the output shaft 6 is rotated in a forward direction, the counter shaft 8 is rotated in a reverse direction. A differential drive pinion gear 10 is fixed to the counter shaft 8 at the other end thereof (opposite the counter driven gear 9) so as to mesh with a drive gear 23 of a differential gear 22. Accordingly, when the counter shaft 8 is rotated, the differential drive pinion gear 10 is rotated to drive the differential gear 22.

Figure 2:
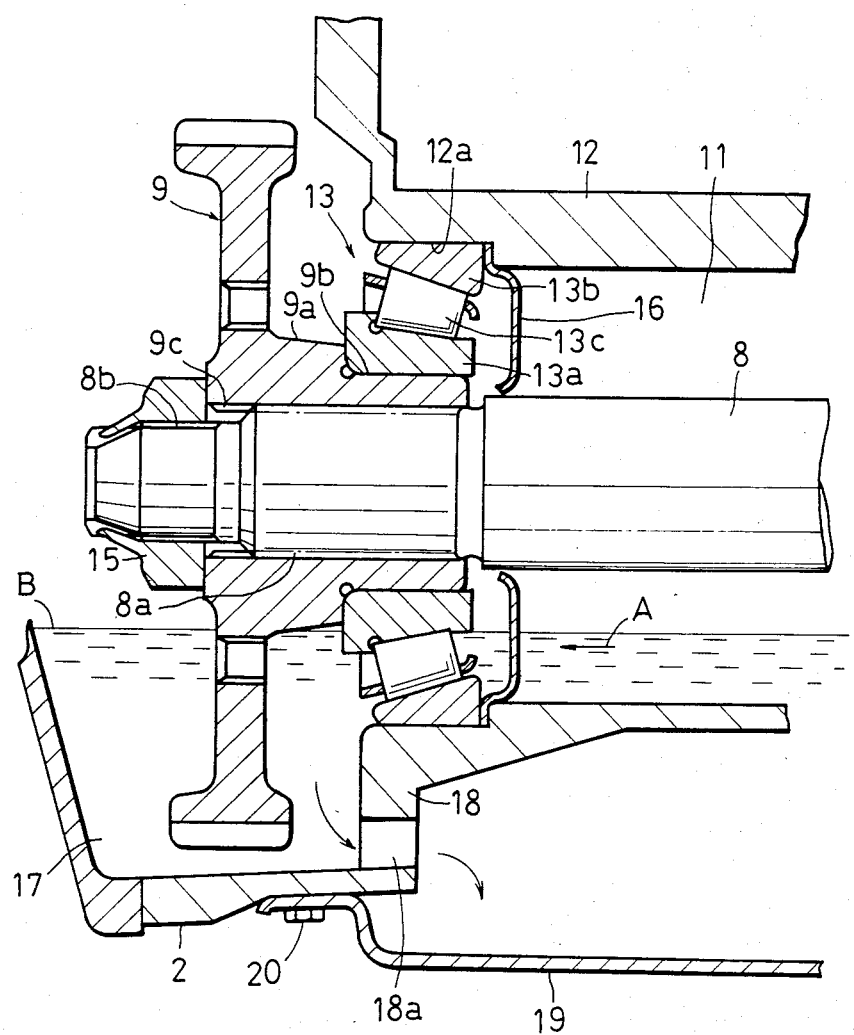
FIG. 2 is an enlarged vertical sectional view of the part encircled by a phantom line C in FIG. 1.

As the counter drive gear 7, counter driven gear 9 and differential drive pinion gear 10 are helical gears, a thrust is applied to the counter shaft 8 during the rotation of the counter shaft 8. In order to receive the thrust, the counter shaft 8 is supported by first and second tapered roller bearings 13 and 14 fixed on the inside wall 12 of a counter shaft chamber 11 of the transmission casing 2. FIG. 2 shows an enlarged cross-sectional view of the first tapered roller bearing 13 for receiving the thrust acting on the counter shaft 8 in the right-hand direction as viewed in FIG. 2. An inner race 13a of the first tapered roller bearing 13 is press-fitted along the outer circumference of the reduced diameter portion 9b of the boss 9a of the counter driven gear 9. An inner spline 9c is formed along the inner circumference of the bore portion of the boss 9a to engage an outer spline 8a formed along the outer circumference of the counter shaft 8. An annular stepped portion 12a is formed at one end of the inside wall 12 of the counter shaft chamber 11 housing the counter shaft 8. An outer race 13b of the first tapered roller bearing 13 is press-fitted along the inner circumference of the stepped portion 12a. The counter driven gear 9 engaged with the counter shaft 8 is rotatably supported by the tapered roller bearing 13 constituted of the inner race 13a, a plurality of tapered rollers 13c and the outer race 13b. A nut 15 is secured to a threaded portion 8b of the counter shaft 8 on the left-hand side of the counter driven gear 9 as viewed in FIG. 2 to fix the counter driven gear 9 on the counter shaft 8.

As shown in FIGS. 3A and 3B, an oil deflector 16 is a disc-like member having a central aperture 16a, an outer circumferential portion 16b and a projected portion 16c. The diameter of the central aperture 16a of the oil deflector 16 is designed to be slightly larger than that of the counter shaft 8. The oil deflector 16 is fixed to the stepped portion 12a of the inner wall 12 in such a manner that the outer circumferential portion 16b is pressed by the outer race 13b of the tapered roller bearing 13 upon press-fitting the outer race 13b into the stepped portion 12a.

The projected portion 16c of the oil deflector 16 is projected toward the counter shaft chamber 11 and is shaped in such a manner that when the outer race 13b is relieved from the stepped portion 12a, the edge of an outer race relieving tool (not shown) does not touch the oil deflector 16.

The counter driven gear 9 is accommodated in a transfer chamber 17 defined in the transmission casing 2. A separator wall 18 for the transfer chamber 17 is provided below the tapered roller bearing 13 and has a lateral opening 18a. An oil pan 19 for storing transmission oil is secured to the lower end of the transfer chamber 17 by an adequate number of bolts 20. The lateral opening 18a communicates with the oil pan 19. In this embodiment, transmission oil is stored at the level depicted by a symbol B in the transfer chamber 17 and the counter shaft chamber 11. Reference numeral 21 designates an oil pump for circulating transmission oil in the automatic transmission 1.

In operation, when the engine is operated, the torque converter 3, input shaft 4, gear train 5 and output shaft 6 are rotated in sequence. As the result, when the counter drive gear 7 secured to the output shaft 6 is rotated and the counter driven gear 9 is also simultaneously rotated, the transmission oil stored in the transfer chamber 17 is stirred and an air bubble are created in the transmission oil. In the prior art without provision of an oil deflector, the transmission oil stored in the counter shaft chamber 11 is sucked into the transfer chamber 17 because of the pumping action of the tapered roller bearing 13 and flows in the direction depicted by a symbol A in FIG. 2. As the result, the amount of the transmission oil to be stirred by the counter driven gear 9 in the transfer chamber 17 is increased. On the contrary, according to this embodiment, the oil deflector 16 is provided for separating the transmission oil in the counter shaft chamber 11, thereby preventing the transmission oil from flowing into the transfer chamber 17 irrespective of the pumping action of the tapered roller bearing 13. Consequently, the amount of the transmission oil to be stirred by the counter driven gear 9 is not increased, the amount of the air bubbles mixing into the oil may be reduced as compared to the prior art, and thus the efficiency of the torque convertor and the oil pump may be improved and the creation of the air dwelling in the hydraulic circuit may be reduced to eliminate failure in the hydraulic control system.

FIGS. 4A and 4B show a second preferred embodiment of the oil deflector disclosed in the present invention. According to this embodiment, the oil deflector 16A is provided with a number of through-holes 16d opened at the projected portion 16c thereof. The oil deflector 16A permits the oil in the counter shaft chamber 11 to pass through the through-holes 16d toward the tapered roller bearing 13. With this structure, the necessary amount of lubricating oil for the first tapered roller bearing 13 may remain high during high speed rotation of the bearing 13. Other operation and effectiveness of the oil deflector 16A in this embodiment is identical with those of the oil deflector 16 in the first preferred embodiment.

Having thus described the preferred embodiments of the invention it should be understood that numerous structural modifications and adaptations may be resorted to without departing from the spirit of the invention.

What is claimed is:

1. In combination with an automatic transmission for a vehicle having a torque converter adapted to be driven by an engine, an input shaft into which an output from said torque converter is transmitted, a gear train into which an output from the input shaft is transmitted, an output shaft into which an output changed by said gear train is transmitted, a counter drive gear fixed to said output shaft at one end thereof opposite said input shaft, a counter shaft arranged in substantially parallel relation with said output shaft, a counter driven gear fixed to said counter shaft at one end thereof and meshed with said counter drive gear, a differential drive pinion gear fixed to said counter shaft at the other end thereof and meshed with a drive gear for a differential gear, first and second tapered roller bearings provided in the vicinity of said counter driven gear and said differential drive pinion gear, respectively, for supporting said counter shaft, said counter shaft being accommodated in a counter shaft chamber of a transmission casing, said counter driven gear being accommodated in a transfer chamber adjacent to said counter shaft chamber and separated therefrom by said first tapered roller bearing, transmission oil being stored in the lower spaces of said counter shaft chamber and said transfer chamber, the lower portions of said counter driven gear and said first tapered roller bearing being immersed in said transmission oil; the improvement comprising a disc-like oil deflector having a central aperture and fixed to the inner wall of said counter shaft chamber adjacent to the smaller end of said first tapered roller bearing, said counter shaft being loosely inserted into said central aperture of said oil deflector.

2. The automatic transmission as defined in claim 1 wherein said oil deflector further comprises a circumferential portion for fixing to said inner wall and a projected portion extending between said circumferential portion and said central aperture, said projected portion projecting generally away from said first roller bearing.

3. The automatic transmission as defined in claim 2 wherein said projected portion has a plurality of through-holes.

4. In combination with an automatic transmission including a counter shaft between a transmission gear and a final reduction gear, and a counter driving gear mounted to said counter shaft, the improvement comprising an oil deflector provided on a smaller diametrical side of a roller of a tapered roller bearing supporting said counter driven gear, whereby oil flow created by a pumping action accompanying rotation of said tapered roller bearing is reduced.

5. The automatic transmission as defined in claim 4 wherein said oil deflector further comprises a circumferential portion for fixing to a wall of a chamber containing said counter shaft, a central aperture through which said counter shaft loosely extends and a projected portion extending between said circumferential portion and said central aperture, said projected portion projecting generally away from said first roller bearing.

* * * * *